US012647341B2

(12) United States Patent
Du et al.

(10) Patent No.: US 12,647,341 B2
(45) Date of Patent: Jun. 2, 2026

(54) ROUTE GENERATION METHOD AND DEVICE

(71) Applicant: HUAWEI TECHNOLOGIES CO., LTD., Shenzhen (CN)

(72) Inventors: Zongpeng Du, Shenzhen (CN); Guoyi Chen, Beijing (CN); Jie Dong, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 27 days.

(21) Appl. No.: 18/759,420

(22) Filed: Jun. 28, 2024

(65) Prior Publication Data

US 2024/0356847 A1      Oct. 24, 2024

Related U.S. Application Data

(63) Continuation of application No. 17/105,434, filed on Nov. 25, 2020, now abandoned, which is a
(Continued)

(30) Foreign Application Priority Data

May 25, 2018    (CN) .......................... 201810515357.1

(51) Int. Cl.
*H04L 45/74*        (2022.01)
*H04L 45/02*        (2022.01)
*H04L 101/686*        (2022.01)

(52) U.S. Cl.
CPC .............. *H04L 45/02* (2013.01); *H04L 45/74* (2013.01); *H04L 2101/686* (2022.05)

(58) Field of Classification Search
CPC ... H04L 45/02; H04L 45/74; H04L 2101/659; H04L 2101/686
See application file for complete search history.

(56) References Cited

U.S. PATENT DOCUMENTS

2002/0126642 A1    9/2002   Shitama
2016/0234188 A1    8/2016   Guan
(Continued)

FOREIGN PATENT DOCUMENTS

CA        3019903 A1    10/2017
CN      103780470 A    5/2014
(Continued)

OTHER PUBLICATIONS

C. Hopps et al,"Routing IPV6 with IS-IS", Network Working Group, Request for Comments: 5308, Oct. 2008, total 7 pages.
(Continued)

*Primary Examiner* — Umar Cheema
*Assistant Examiner* — Adam A Cooney
(74) *Attorney, Agent, or Firm* — Leydig, Voit & Mayer, Ltd.

(57) ABSTRACT

A route generation method, performed in an SRv6 network and including: receiving, by a first network device, a first notification packet from a second network device; where the first notification packet includes a network slice identifier, the first notification packet indicates an association relationship between information of the network slice identifier and an IPv6 address prefix of the second network device, and the network slice identifier is used to identify one network slice; and generating, by the first network device, a route forwarding entry for the IPv6 address prefix of the second network device based on an association relationship between the network slice identifier and the IPv6 address prefix of the second network device. This helps implement a network slice and resource isolation in the SRv6.

28 Claims, 7 Drawing Sheets

Related U.S. Application Data continuation of application No. PCT/CN2019/082353, filed on Apr. 12, 2019.

(56)  References Cited

U.S. PATENT DOCUMENTS

| | | | | |
|---|---|---|---|---|
| 2016/0359720 | A1* | 12/2016 | Li | H04L 45/02 |
| 2017/0054626 | A1 | 2/2017 | Sivabalan et al. | |
| 2017/0118043 | A1* | 4/2017 | Hao | H04L 61/5061 |
| 2017/0237656 | A1 | 8/2017 | Gage | |
| 2017/0302476 | A1* | 10/2017 | Yang | H04L 12/4683 |
| 2017/0346718 | A1 | 11/2017 | Psenak et al. | |
| 2018/0375763 | A1* | 12/2018 | Brissette | H04L 45/24 |
| 2019/0007305 | A1 | 1/2019 | Filsfils et al. | |
| 2019/0215267 | A1* | 7/2019 | Filsfils | H04L 45/34 |
| 2020/0128445 | A1 | 4/2020 | Dong et al. | |
| 2020/0244588 | A1 | 7/2020 | Filsfils et al. | |
| 2020/0382415 | A1* | 12/2020 | Chunduri | H04L 45/34 |
| 2022/0345984 | A1* | 10/2022 | Patel | H04L 69/22 |
| 2024/0187978 | A1* | 6/2024 | Hedman | H04L 41/5051 |

FOREIGN PATENT DOCUMENTS

| | | | |
|---|---|---|---|
| CN | 105337865 | A | 2/2016 |
| CN | 105871721 | A | 8/2016 |
| CN | 107181689 | A | 9/2017 |
| CN | 107566272 | A | 1/2018 |
| CN | 109218201 | A | 1/2019 |
| WO | 2012055446 | A1 | 5/2012 |
| WO | 2017002046 | A1 | 1/2017 |
| WO | 2017168218 | A1 | 10/2017 |
| WO | 2017218775 | A1 | 12/2017 |
| WO | 2017220132 | A1 | 12/2017 |
| WO | 2018006017 | A1 | 1/2018 |
| WO | 2018082652 | A1 | 5/2018 |

OTHER PUBLICATIONS

T. Li et al,"IS-IS Extensions for Traffic Engineering", Network Working Group, Request for Comments: 5305, Oct. 2008, total 17 pages.

H. Gredler, Ed et al,"North-Bound Distribution of Link-State and Traffic Engineering (TE) Information Using BGP", Internet Engineering Task Force (IETF), Request for Comments: 7752, Mar. 2016, total 48 pages.

A. Sajassi, Ed et al,"BGP MPLS-Based Ethernet VPN", Internet Engineering Task Force (IETF), Request for Comments: 7432, Feb. 2015, total 56 pages.

L. Ginsberg et al,"Updates to the IS-IS TLV Codepoints Registry", Internet Engineering Task Force (IETF), Request for Comments: 7370, Sep. 2014, total 7 pages.

J. Hui et al,"An IPV6 Routing Header for Source Routes with the Routing Protocol for Low-Power and Lossy Networks (RPL)", Internet Engineering Task Force (IETF), Request for Comments: 6554, Mar. 2012, total 13 pages.

C. Perkins, Ed et al,"Mobility Support in IPV6", Internet Engineering Task Force (IETF), Request for Comments: 6275, Jul. 2011, total 169 pages.

F. Le Faucheur et al,"Advertising IPV4 Network Layer Reachability Information with an IPV6 Next Hop", Network Working Group, May 2009, total 10 pages.

J. De Clercq et al,"BGP-MPLS IP Virtual Private Network (VPN) Extension for IPv6 Vpn", Network Working Group, Request for Comments: 4659, Sep. 2006, total 18 pages.

Y. Rekhter, Ed et al,"A Border Gateway Protocol 4 (BGP-4)", Network Working Group, Request for Comments: 4271, Jan. 2006, total 104 pages.

S. Deering et al,"Internet Protocol, Version 6 (IPv6) Specification", Network Working Group, Request for Comments: 2460, Dec. 1998, total 39 pages.

S. Previdi et al,"IPv6 Segment Routing Header (SRH) draft-ietf-6man-segment-routing-header-13", Network Working Group Internet-Draft, May 23, 2018, total 21 pages.

C. Filsfils et al,"SRv6 Network Programming draft-filsfils-spring-srv6-network-programming-04", Spring Internet-Draft, Mar. 4, 2018, total 57 pages.

G. Dawra, Ed. et al,"BGP Signaling of IPv6-Segment-Routing-based VPN Networks draft-dawra-idr-srv6-vpn-03", Inter-Domain Routing Internet-Draft, Dec. 26, 2017, total 20 pages.

L. Ginsberg et al,"IS-IS Extensions to Support Routing over IPv6 Dataplane draft-bashandy-isis-srv6-extensions-02.txt", Networking Working Group Internet-Draft, Mar. 19, 2018, total 17 pages.

T. Przygienda et al,"M-ISIS: Multi Topology (MT) Routing in Intermediate System to Intermediate Systems (IS-ISs)", Network Working Group, Request for Comments: 5120, Feb. 2008, total 14 pages.

S. Matsushima et al.,"Segment Routing IPv6 for Mobile User Plane;draft-ietf-dmm-srv6-mobile-uplane-01",DMM Working Group,Internet-Draft, Intended status: Standards Track,Mar. 5, 2018,total 23 pages.

Previdi S et al,"Segment Routing with IS-IS Routing Protocol; draft-previdi-filsfils-isis-segment-routing-02", Mar. 20, 2013, total 27 pages.

Ahmed Bashandy et al,"Segment Routing Automatic Inter-IGP-Domain Inter-Operability With the Ability of Zero-Packet-Loss Domain Merge", ip.com, ip.com Inc., West Henrietta, NY, US, Mar. 7, 2016, total 9 pages.

* cited by examiner

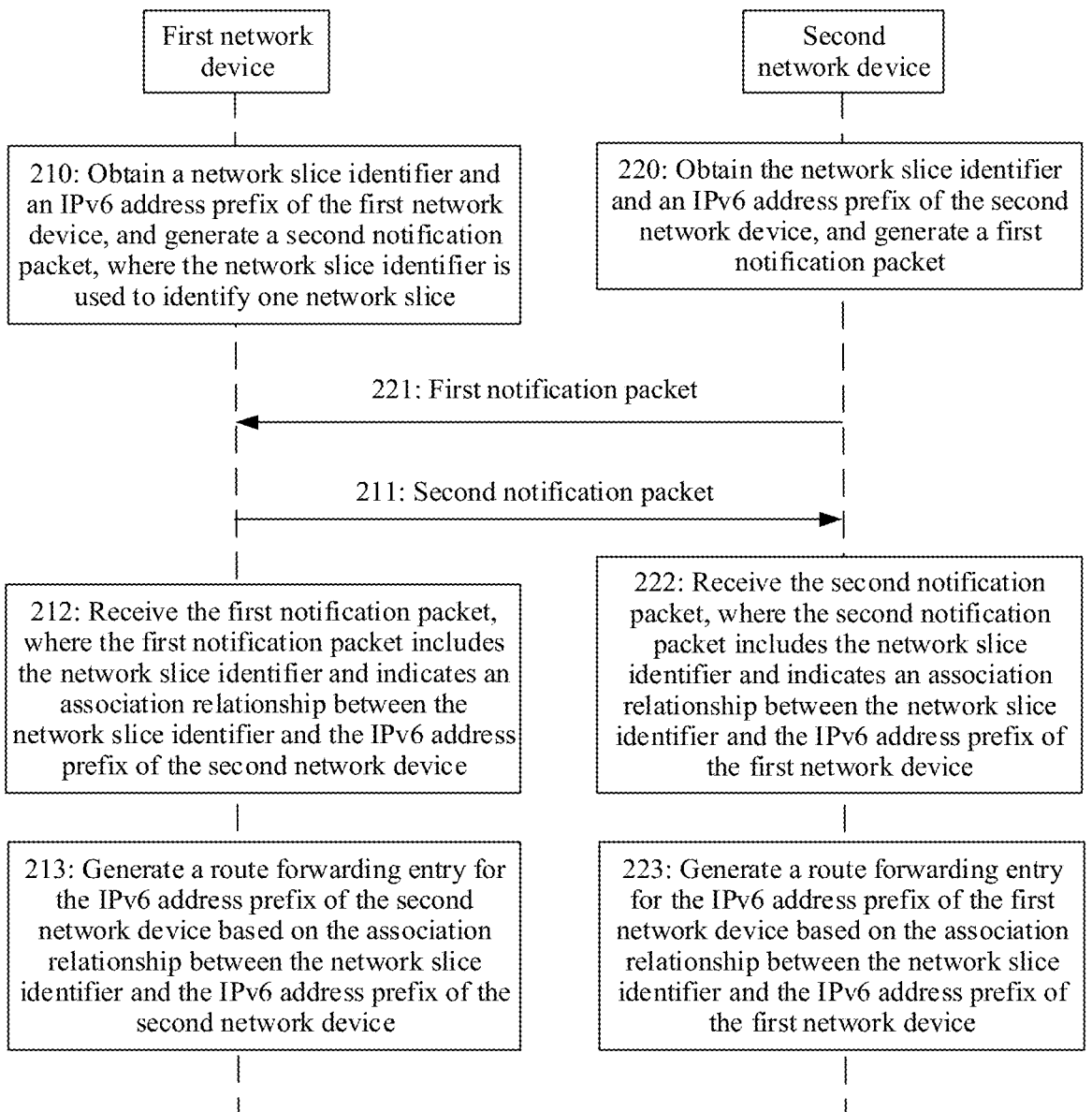

First network device

Second network device

210: Obtain a network slice identifier and an IPv6 address prefix of the first network device, and generate a second notification packet, where the network slice identifier is used to identify one network slice 220: Obtain the network slice identifier and an IPv6 address prefix of the second network device, and generate a first notification packet 221: First notification packet 211: Second notification packet 212: Receive the first notification packet, where the first notification packet includes the network slice identifier and indicates an association relationship between the network slice identifier and the IPv6 address prefix of the second network device 222: Receive the second notification packet, where the second notification packet includes the network slice identifier and indicates an association relationship between the network slice identifier and the IPv6 address prefix of the first network device 213: Generate a route forwarding entry for the IPv6 address prefix of the second network device based on the association relationship between the network slice identifier and the IPv6 address prefix of the second network device 223: Generate a route forwarding entry for the IPv6 address prefix of the first network device based on the association relationship between the network slice identifier and the IPv6 address prefix of the first network device

FIG. 2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+
| Type = 236  |    Length    |         Metric ..           |
+-+-+-+-+-+-+-+-+-+-+-+-+-+-+-+-+-+-+-+-+-+-+-+-+-+-+-+-+-+-+-+
|      .. Metric          |U|X|S| Reserve | Prefix Len |
+-+-+-+-+-+-+-+-+-+-+-+-+-+-+-+-+-+-+-+-+-+-+-+-+-+-+-+-+-+-+-+
| Prefix ...
  +-+-+-+-+-+-+-+-+-+-+-+-+-+-+-+-+-+-+-+-+-+-+-+-+-+-+-+-+-+
|Sub-TLV Len | Sub-TLV ...
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+
|    Sub-type    |   Sub-length   |          Sub-value
+-+-+-+-+-+-+-+-+-+-+-+-+-+-+-+-+-+-+-+-+-+-+-+-+-+-+-+-+-+-+-+
```

ROUTE GENERATION METHOD AND DEVICE

CROSS-REFERENCE TO RELATED APPLICATIONS

This application is a continuation of U.S. patent application Ser. No. 17/105,434, filed on Nov. 25, 2020, which is a continuation of International Application No. PCT/CN2019/082353, filed on Apr. 12, 2019, which claims priority to Chinese Patent Application No. 201810515357.1, filed on May 25, 2018. All of the aforementioned patent applications are hereby incorporated by reference in their entireties.

TECHNICAL FIELD

The present disclosure relates to the field of communications technologies, and specifically, to a route generation method, a network device, and a system.

BACKGROUND

A network slice (Network Slicing) is a virtualization form that allows a plurality of logical networks to run on a shared physical network infrastructure. In other words, based on a shared physical network, a corresponding network slice (or a virtual network) is partitioned by using a virtualization technology, to meet differentiated requirements of a user. Resources in virtual network slices are logically isolated, independent of each other, and do not affect each other.

Segment routing inherits from and innovates on an internet protocol (Internet Protocol, IP) routing technology, and has a unique advantage in aspects such as implementing network virtualization, and network programmability. An SR data plane is implemented in two manners: multiprotocol label switching (Multi-Protocol Label Switching, MPLS) or an internet protocol version 6 (Internet Protocol version 6, IPv6). An IPv6-based SR is referred to as an internet protocol version 6 segment routing (Internet Protocol version 6 Segment Routing, IPv6 SR) or segment routing over IPv6 data plane (SRv6). However, the SRv6 currently does not support resource isolation, and cannot implement a network slice to generate a corresponding route for each network slice.

SUMMARY

A route generation method, a network device, and a system provided in embodiments of the present disclosure help resolve a problem of generating a corresponding route for each network slice in an SRv6 network. This implements a network slice in the SRv6 network.

To resolve the foregoing problem, a first aspect of the embodiments of the present disclosure provides a route generation method, applied to an SRv6 network, and the method includes: receiving, by a first network device, a first notification packet from a second network device, where the first notification packet includes a network slice identifier, the first notification packet indicates an association relationship between information of the network slice identifier and an IPv6 address prefix of the second network device, and the network slice identifier is used to identify one network slice; and generating, by the first network device a route forwarding entry for the IPv6 address prefix of the second network device based on an association relationship between the network slice identifier and the IPv6 address prefix of the second network device, where the route forwarding entry of the IPv6 address prefix of the second network device is in the network slice.

The network slice identifier is associated with the IPv6 address prefix of the network device, and flooding is performed inside the SRv6 network, so as to generate a route for an IPv6 address prefix of each network slice. In this way, an SRv6 physical network is sliced into a virtual network, and resources in different virtual networks are isolated from each other and do not affect each other.

In a possible design, the first network device obtains the network slice identifier and an IPv6 address prefix of the first network device, and generates a second notification packet; and the first network device sends the second notification packet to the second network device, where the second notification packet includes the network slice identifier, and the second notification packet indicates an association relationship between the information of the network slice identifier and the IPv6 address prefix of the first network device.

The network slice identifier is associated with the IPv6 address prefix of the network device, and flooding is performed inside the SRv6 network, so as to help further generate the route for the IPv6 address prefix of each network slice. In this way, the SRv6 physical network is sliced into the virtual network, and the resources in the different virtual networks are isolated from each other and do not affect each other.

In a possible design, the first notification packet is an intermediate system to intermediate system ISIS protocol link state protocol data unit LSPDU message, the LSPDU message includes the network slice identifier, and the LSPDU message indicates the association relationship between the information of the network slice identifier and the IPv6 address prefix of the second network device.

The ISIS LSPDU message carries the network slice identifier and indicates the association relationship between the information of the network slice identifier and the IPv6 address prefix. In this way, the SRv6 physical network is sliced into the virtual network, and this helps easily implement an SRv6 network slice.

In a possible design, the LSPDU message includes an IPv6 reachable type-length-value TLV field, the IPv6 reachable TLV field includes a prefix field and a sub-type-length-value sub-TLV field, the prefix field is used to carry the IPv6 address prefix of the second network device, and the sub-TLV field is used to carry the network slice identifier.

The ISIS LSPDU message carries the network slice identifier in the sub-TLV and indicates the association relationship between the information of the network slice identifier and the IPv6 address prefix. In this way, the SRv6 physical network is sliced into the virtual network, there is no need to modify a large quantity of standards, and compatibility with an existing standard is good.

In a possible design, the first notification packet is an interior gateway protocol IGP notification message, the notification message includes an SRv6 segment identifier SID, the SID includes a locator part, the locator part includes the network slice identifier, and the locator part indicates the association relationship between the information of the network slice identifier and the IPv6 address prefix of the second network device.

The locator part in the SRv6 SID field carries the network slice identifier and indicates the association relationship between the information of the network slice identifier and the IPv6 address prefix. In this way, the SRv6 physical network is sliced into the virtual network, a network administrator can easily identify the virtual network based on the SID, and this facilitates manual management and reduces operations and/or configuration errors.

In a possible design, the locator part includes the network slice identifier and the IPv6 address prefix of the second network device. The method is simple and clear, and helps efficiently and correctly manage a network.

According to a second aspect, an embodiment of the present disclosure provides a notification packet sending method, applied to an SRv6 network, and the method includes: obtaining, by a second network device, a network slice identifier and an IPv6 address prefix of the second network device, and generating a first notification packet; and sending, by the second network device, the first notification packet to the first network device, where the first notification packet includes the network slice identifier, the first notification packet indicates an association relationship between information of the network slice identifier and the IPv6 address prefix of the second network device, and the network slice identifier is used to identify one network slice.

According to a third aspect, the present disclosure provides a first network device, and the first network device is configured to perform the method in any one of the first aspect or the possible implementations of the first aspect. Specifically, the first network device includes a module configured to perform the method in any one of the first aspect or the possible implementations of the first aspect.

According to a fourth aspect, the present disclosure provides a first network device, and the first network device includes a processor, a transceiver, a random access memory, a read-only memory, and a bus. The processor is separately coupled to the transceiver, the random access memory, and the read-only memory by using the bus. When the first network device needs to run, the first network device is started by using a basic input/output system built into the read-only memory or a bootloader booting system in an embedded system, to boot the first network device to enter a normal running state. After the first network device enters the normal running state, an application program and an operating system run in the random access memory, to enable the processor to perform the method in any one of the first aspect or the possible implementations of the first aspect.

According to a fifth aspect, a first network device is provided, and the first network device includes a central processing unit, a forwarding entry memory, a physical interface card, and a network processor. The first network device is configured to perform the method in any possible implementation of the first aspect. Specifically, the first network device includes a module configured to perform the method in any one of the first aspect or the possible implementations of the first aspect.

According to a sixth aspect, the present disclosure provides a computer-readable medium including an instruction, and when the instruction is run on a computer, the computer is enabled to perform the method in any one of the first aspect or the possible implementations of the first aspect.

According to a seventh aspect, the present disclosure provides a second network device, and the second network device is configured to perform the method in any one of the second aspect or the possible implementations of the second aspect. Specifically, the second network device includes a module configured to perform the method in any one of the second aspect or the possible implementations of the second aspect.

According to an eighth aspect, the present disclosure provides a second network device, and the second network device includes a processor, a transceiver, a random access memory, a read-only memory, and a bus. The processor is separately coupled to the transceiver, the random access memory, and the read-only memory by using the bus. When the second network device needs to run, the second network device is started by using a basic input/output system built into the read-only memory or a bootloader booting system in an embedded system, to boot the second network device to enter a normal running state. After the second network device enters the normal running state, an application program and an operating system run in the random access memory, to enable the processor to perform the method in any one of the second aspect or the possible implementations of the second aspect.

According to a ninth aspect, a second network device is provided, and the second network device includes a central processing unit, a forwarding entry memory, a physical interface card, and a network processor. The second network device is configured to perform the method in any possible implementation of the second aspect. Specifically, the second network device includes a module configured to perform the method in any one of the second aspect or the possible implementations of the second aspect.

According to a tenth aspect, the present disclosure provides a computer-readable medium including an instruction, and when the instruction is run on a computer, the computer is enabled to perform the method in any one of the second aspect or the possible implementations of the second aspect.

According to an eleventh aspect, the present disclosure provides a system, and the system includes the first network device in any one of the third aspect to the fifth aspect and the second network device in any one of the seventh aspect to the ninth aspect.

BRIEF DESCRIPTION OF DRAWINGS

To describe the technical solutions in the embodiments of this application more clearly, the following briefly introduces the accompanying drawings required for describing the embodiments. It is clearly that the accompanying drawings in the following description show merely some embodiments recorded in this application, and a person of ordinary skill in the art may still derive other drawings from these accompanying drawings.

FIG. 2 is a schematic flowchart of a route generation method according to an embodiment of the present disclosure;

DESCRIPTION OF EMBODIMENTS

In order to enable a person skilled in the art to better understand the solutions in the present disclosure, the following further describes the embodiments of the present disclosure in detail with reference to accompanying drawings and implementations. It is clearly that the described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
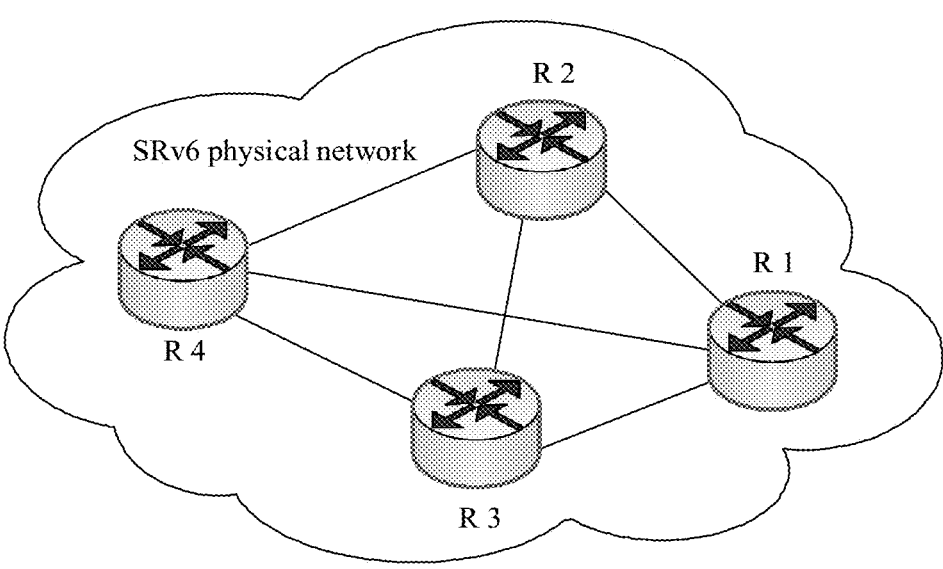
FIG. 1 is a schematic diagram of a scenario to which an SRv6 network is applicable according to an embodiment of the present disclosure.

Before the technical solutions of the embodiments of the present disclosure are described, a scenario to which the embodiments of the present disclosure are applicable is first described as an example. The present disclosure is applied to an SRv6 network. The SRv6 network usually includes a plurality of network devices that support an IPv6 segment routing technology, and the network device may be a device such as a router or a switch. The router and the switch may be physical devices, or may be virtualization technology-based virtual devices (for example, a virtual server, a virtual router, and a virtual switch). As shown in FIG. 1, for example, the SRv6 network includes routers R 1, R 2, R 3, and R 4. The routers in the SRv6 network flood SR routing information through interaction of an interior gateway protocol (IGP), to discover a topology and generate a route forwarding entry for the SRv6 network.

The foregoing describes the possible scenario to which the present disclosure is related and a problem that exists in a network slice aspect of a SRv6 technology. Based on this, the following further describes the embodiments of the present disclosure in detail.

FIG. 2 is a schematic flowchart of a route generation method according to an embodiment of the present disclosure. With reference to the scenario example shown in FIG. 1, a first network device and a second network device in FIG. 2 are any router shown in FIG. 1. For example, if the first network device is the router R 1, the second network device is any one of the other routers R 2, R 3, or R 4 except R 1 in FIG. 1.

As shown in FIG. 2, an interaction process between the first network device and the second network device is described in the solution provided in this embodiment of the present disclosure. Operations performed by the first network device include parts 210, 211, 212, and 213, and operations performed by the second network device include parts 220, 221, 222, and 223, which are described below.

Part 220: The second network device obtains the network slice identifier and an IPv6 address prefix of the second network device, and generates a first notification packet, where the network slice identifier is used to identify one network slice.

Part 221: The second network device sends the first notification packet to the first network device.

In a specific implementation, that the second network device obtains the network slice identifier (for example, a slice ID 1) and the IPv6 address prefix (for example, an IPv6 prefix 2) of the second network device includes: The second network device configures the network slice identifier and the IPv6 address prefix of the second network device on the second network device based on a configuration command, the second network device receives a message sent by a control management device, and obtains from the message, the network slice identifier and the IPv6 address prefix of the second network device, the second network device generates the network slice identifier and the IPv6 address prefix of the second network device by using an algorithm that is run on the second network device, or when the second network device is implemented based on software, the second network device sets default values of the network slice identifier and the IPv6 address prefix of the second network device.

Likewise, part 210: The first network device obtains the network slice identifier and an IPv6 address prefix of the first network device, and generates a second notification packet.

Part 211: The first network device sends the second notification packet to the second network device.

In a specific implementation, that the first network device obtains the network slice identifier (for example, the slice ID 1) and the IPv6 address prefix (for example, an IPv6 prefix 1) of the first network device includes: The first network device configures the network slice identifier and the IPv6 address prefix of the first network device on the first network device based on a configuration command, the first network device receives a message sent by a control management device, and obtains from the message, the network slice identifier and the IPv6 address prefix of the first network device, the first network device generates the network slice identifier and the IPv6 address prefix of the first network device by using an algorithm that is run on the first network device, or when the first network device is implemented based on software, the first network device sets default values of the network slice identifier and the IPv6 address prefix of the first network device.

Part 212: The first network device receives the first notification packet from the second network device, where the first notification packet includes the network slice identifier and indicates an association relationship between information of the network slice identifier and the IPv6 address prefix of the second network device.

In a specific implementation, routers in an SRv6 network 1 flood SR routing information based on an IGP, to discover a network topology and generate a route for the SRv6 network 1. The SR routing information includes information such as a node segment identifier (Node SID), an adjacency segment identifier (Adjacency SID), and an IPv6 address prefix. The IGP is ISIS or the open shortest path first (OSPF).

For example, the first notification packet is an ISIS protocol link state protocol data unit (LSPDU) message, and the LSPDU message includes the network slice identifier and indicates the association relationship between the information of the network slice identifier and the IPv6 address prefix of the second network device.

Figure 3A:
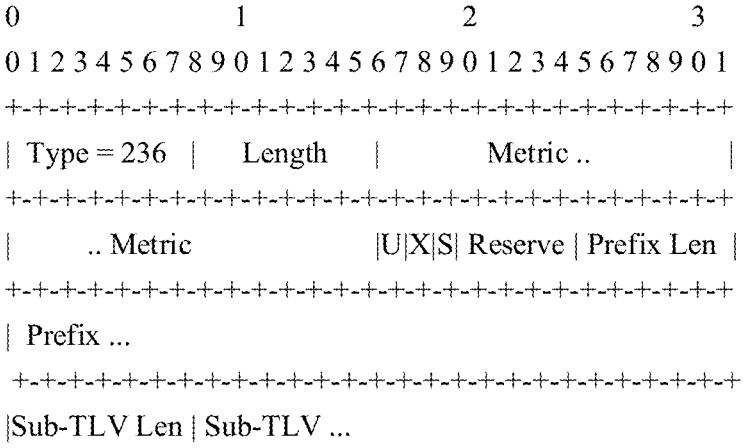
FIG. 3A is a schematic diagram of a format of an IPv6 reachable TLV field according to an embodiment of the present disclosure.

The LSPDU message includes an IPv6 reachable type-length-value (TLV) field. As shown in FIG. 3A, the IPv6 reachable TLV field includes a prefix field and a sub-type-length-value (sub-TLV) field. The prefix field is used to carry the IPv6 address prefix, and the sub-TLV field is used to carry the network slice identifier.

Figure 3B:
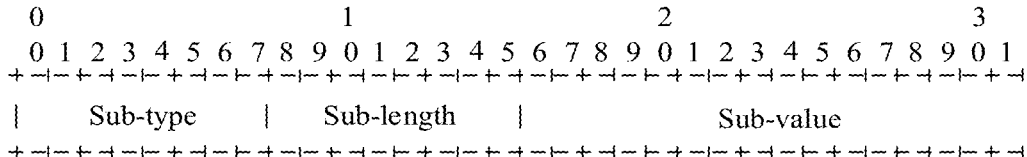
FIG. 3B is a schematic diagram of a format of a network slice identifier sub-TLV field according to an embodiment of the present disclosure.

As shown in FIG. 3B, the sub-TLV field includes a sub-type field, a sub-length field, and a sub-value field. The sub-type field indicates the network slice identifier, the sub-length field indicates a length of the sub-value field or a length of the sub-TLV field, and the sub-value is a value of the network slice identifier, for example, a value 1 indicates a network slice whose slice ID is 1.

It should be noted that, for details about the LSPDU message in the present disclosure, refer to the ISO-10589 standard released by International Organization for Standardization (ISO), and for details about the IPv6 reachable TLV, refer to the Request For Comments (RFC) 5308 released by Internet Engineering Task Force (IETF). Content in the two standards related to each of the LSPDU message and the IPv6 reachable TLV is generally incorporated into this specification by reference as if it were replicated as a whole. For brevity, details are not described herein.

The ISIS LSPDU message carries the network slice identifier in the sub-TLV and indicates the association relationship between the information of the network slice identifier and the IPv6 address prefix. In this way, an SRv6 physical network is sliced into a virtual network, there is no need to modify a large quantity of standards, and compatibility with an existing standard is good. Therefore, it is a simple and easy-to-use SRv6 network slicing method.

It should be noted that, the LSPDU message provided in this embodiment of the present disclosure is used to carry the network slice identifier, and indicate the association relationship between the information of the network slice identifier and the IPv6 address prefix of the second network device is merely an example, and does not constitute a limitation.

In another specific implementation, the first notification packet is an IGP notification message, and the IGP is ISIS or OSPF. The first notification packet includes an SRv6 segment identifier (SID). For example, the first notification packet is an ISIS protocol link state protocol data unit (LSPDU) message, and the LSPDU message includes the SRv6 SID in two manners.

One is that the LSPDU message includes an extended IS reachable (Extended IS Reachability) TLV defined in the IETF RFC 5305, where a type value of the extended IS reachability TLV is 22, and the extended IS reachability TLV includes the SRv6 SID. Content in the standard related to the extended IS reachability TLV is generally incorporated into this specification by reference as if it were replicated as a whole. For brevity, details are not described herein.

The other is that the LSPDU message includes an SRv6 adjacency segment identifier sub-type-length-value (Adjacency-SID sub-TLV) or an SRv6 local area network adjacency segment identifier sub-type-length-value (LAN Adjacency-SID sub-TLV) defined in the IETF draft-bashandy-isis-srv6-extensions-02 draft, and the SRv6 adjacency-SID sub-TLV or the SRv6 LAN adjacency-SID sub-TLV includes the SRv6 SID. Content in the IETF draft related to the SRv6 adjacency-SID sub-TLV or the SRv6 LAN adjacency-SID sub-TLV is generally incorporated into this specification by reference as if it were replicated as a whole. For brevity, details are not described herein.

The SRv6 SID includes a locator part and a function part. The locator part includes the network slice identifier and indicates the association relationship between the information of the network slice identifier and the IPv6 address prefix of the second network device. For example, in one case, the SRv6 SID is a 128-bit value.

Figure 4A:
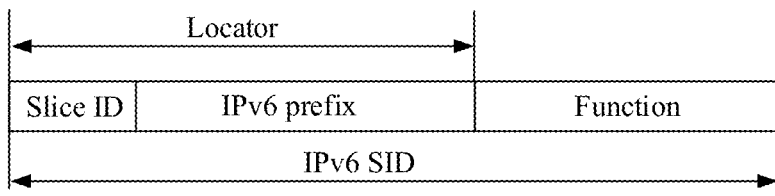
FIG. 4A is a schematic structural diagram of an IPv6 SID according to an embodiment of the present disclosure.

FIG. 4A is a schematic structural diagram of the SRv6 SID field. The locator part (or field) includes a slice identifier (Slice ID) field and an IPv6 prefix field, and the slice ID field is located at a head-end of the locator field. The slice ID field is used to carry the information of the network slice identifier, and the IPv6 prefix field is used to carry the IPv6 address prefix of the first network device.

Figure 4B:
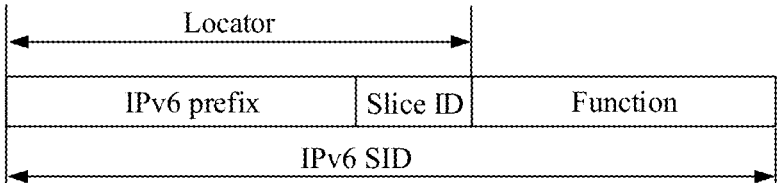
FIG. 4B is a schematic structural diagram of another IPv6 SID according to an embodiment of the present disclosure.

It should be noted that, as shown in FIG. 4B, the slice ID field may also be located at a tail end of the locator field. FIG. 4A and FIG. 4B each shows an example of a location of the slice ID field in the locator field, but does not constitute a limitation. For example, the slice ID field may alternatively be located in the middle of the locator field.

The locator part in the SRv6 SID field carries the network slice identifier and indicates the association relationship between the information of the network slice identifier and the IPv6 address prefix. In this way, an SRv6 physical network is sliced into a virtual network, a network administrator can easily identify a corresponding virtual network based on the SID, and this facilitates manual management. Because the slice ID is included in the SID, when the administrator views the SID, the administrator can identify a virtual network (or a network slice) to which the SID belongs, to identify an operation and/or a configuration error. This reduces incorrect configuration and a misoperation, and helps efficiently and correctly manage a network.

It should be noted that, the SRv6 SID in the LSPDU message provided in this embodiment of the present disclosure is used to carry the network slice identifier, and the SRv6 SID indicates the association relationship between the information of the network slice identifier and the IPv6 address prefix of the second network device is merely an example, and does not constitute a limitation. The SRv6 SID can also be carried in another IGP message.

Part 213: The first network device generates and stores a route forwarding entry for the IPv6 address prefix of the second network device based on the association relationship between the network slice identifier (for example, the network slice identifier indicates a network slice 1 (Slice 1)) and the IPv6 address prefix (IPv6 Prefix 2) of the second network device. The route forwarding entry is an entry in the network slice. For example, as shown in Table 1, the route forwarding entry includes an association relationship between a match item and an execution action, and the match item includes an IPv6 address prefix. When the first network device receives a data packet that is in the slice 1 and that is destined for an address whose prefix is the prefix 2, the first network device searches for the route forwarding entry based on the prefix 2, and performs a corresponding operation after the route forwarding entry is found, for example, actions such as forwarding the data packet to an outbound interface or a next hop.

TABLE 1

| IPv6 prefix | Action |
| --- | --- |
| Prefix 2 | Outbound interface, next hop, or the like |

It should be noted that, in this embodiment of the present disclosure, the solution is described only by using an interaction processing process between the first network device and the second network device as an example. It may be understood that the first network device further receives a notification packet sent by each of the other network devices in the SRv6 network, and the first network device also sends a notification packet of the first network device to each of the other network devices in the SRv6 network.

Figure 5:
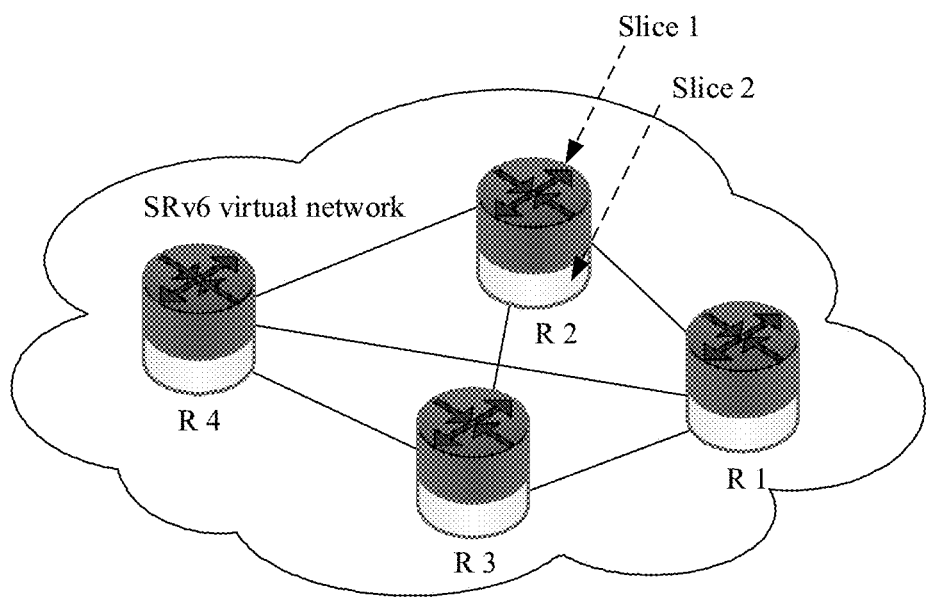
FIG. 5 is a schematic diagram of a virtual network into which an SRv6 physical network is sliced according to an embodiment of the present disclosure.

Therefore, the SR routing information is flooded in the SRv6 network by using the IGP, and the SR routing information is associated with the network slice identifier (for example, the network slice identifier indicates the network slice 1 (Slice 1)). In this way, each router in the SRv6 network 1 obtains the SR routing information associated with the network slice identifier (for example, the slice 1) in the SRv6 network, and this generates a network topology of the network slice (for example, the slice 1) indicated in the network slice identifier in the SRv6 network. Finally, each router in the SRv6 network calculates a route forwarding entry based on the network topology of the network slice (for example, the slice 1), where the route forwarding entry is in the network slice (for example, the slice 1). Likewise, several network slices such as a slice 2 may also be generated. After the SR routing information is associated with the network slice identifier, flooding is performed inside the SRv6 network. In this way, the SRv6 physical network is sliced into several virtual networks (a slice 1 and a slice 2 in network slices shown in FIG. 5) and resources in different virtual networks are isolated from each other, and do not affect each other.

In addition, an IPv6 prefix-based route forwarding entry is generated by flooding the association relationship between the IPv6 prefix and the slice ID. An IP address prefix has a function of aggregating an IP address, so that one IP prefix may cover several IP addresses with a same IP prefix, and therefore IP address-based route forwarding entry may be aggregated, and a quantity of route forwarding entries can be reduced, to save storage space of a network device.

Part 222: The second network device receives the second notification packet from the first network device, where the second notification packet includes the network slice identifier and indicates an association relationship between information of the network slice identifier and the IPv6 address prefix of the first network device.

Part 223: The second network device generates and stores a route forwarding entry for the IPv6 address prefix of the first network device in the network slice based on the association relationship between the information of the network slice identifier and the IPv6 address prefix of the first network device.

Specific implementation principles of parts 222 and 223 are the same as the specific implementation principles of parts 212 and 213. For details, refer to related chapters. Details are not described again.

Figure 6A:
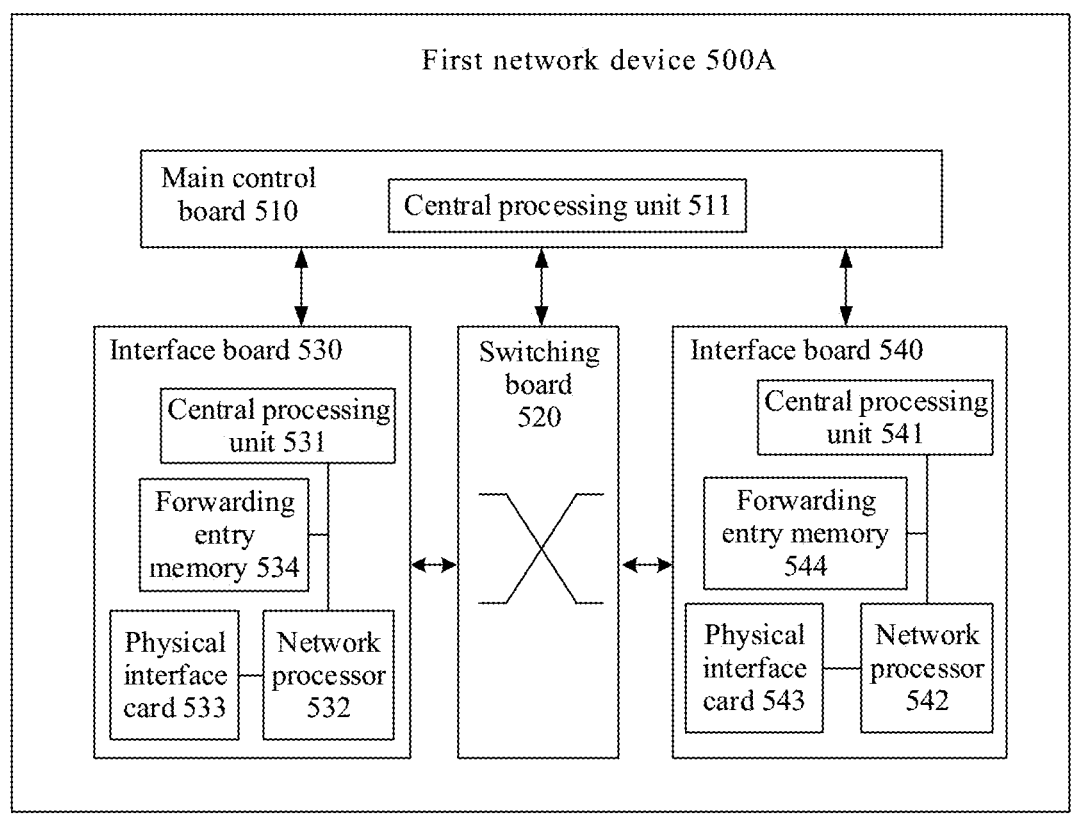
FIG. 6A is a schematic structural diagram of a first network device according to an embodiment of the present disclosure.

FIG. 6A is a possible schematic structural diagram of a first network device 500A to which the foregoing embodiment relates. The first network device 500A is applied to an SRv6 network, and includes a main control board 510, an interface board 530, a switching board 520, and an interface board 540. The main control board 510 is configured to complete functions such as system management, device maintenance, and protocol processing. The switching board 520 is configured to exchange data between various interface boards (the interface board is also referred to as a line card or a service board). The interface boards 530 and 540 are configured to provide various service interfaces (for example, an Ethernet interface and a POS interface), and implement data packet forwarding. The main control board 510, the interface boards 530 and 540, and the switching board 520 are connected to a platform backboard by using a system bus for interworking. A central processing unit 531 on the interface board 530 is configured to control and manage the interface board and communicate with a central processing unit 511 on the main control board 510.

The first network device 500A receives a first notification packet from a second network device from a physical interface card 533, where the first notification packet includes a network slice identifier and indicates an association relationship between information of the network slice identifier and an IPv6 address prefix of the second network device (which is consistent with related descriptions in FIG. 2, and details are not described herein again). The physical interface card 533 sends the first notification packet to a network processor 532 and the network processor 532 searches for a forwarding entry memory 534 according to a destination address (which is a local IP address of the first network device) in the first notification packet. A local packet is indicated in a matching result. Therefore, the network processor 532 sends the first notification packet upward to the central processing unit 511 in a control plane. The central processing unit 511 on the main control board 510 is further configured to generate a route forwarding entry for the IPv6 address prefix (based on the IPv6 address prefix, the forwarding entry is generated in a route forwarding entry corresponding to the network slice) based on an association relationship between the network slice identifier and the IPv6 address prefix of the second network device, and deliver the route forwarding entry to the forwarding entry memory 534 by using the central processing unit 531.

For steps that the central processing unit 511 specifically performs to perform the function in Part 213 in FIG. 2, and steps that the physical interface card 533 and the network processor 532 specifically perform to implement the function in Part 212 in FIG. 2, refer to the foregoing related descriptions. Details are not described herein again.

It should be understood that, in this embodiment of the present disclosure, an operation on the interface board 540 is consistent with an operation on the interface board 530. For brevity, details are not described again. It should be understood that the first network device 500A in this embodiment of the present disclosure may correspond to the first network device in the network slice method embodiment, modules in the first network device 500A and the foregoing other operations and/or functions are separately used to implement the steps and methods implemented by the first network device in the embodiments corresponding to FIG. 1 to FIG. 5. For brevity, details are not described herein again.

It should be noted that, there may be one or more main control boards, and when there are a plurality of main control boards, the main control boards may include an active main control board and a standby main control board. There may be one or more interface boards, and the first network device having a stronger data processing capability provides more interface boards. There may also be one or more physical interface cards on the interface board. There may be no switching board, or one or more switching boards. When there are a plurality of switching boards, load sharing and redundancy backup may be implemented together. In a centralized forwarding architecture, the first network device may need no switching board, and the interface board provides a function of processing service data of an entire system. In a distributed forwarding architecture, the first network device may have at least one switching board, and exchange data between a plurality of interface boards by using the switching board, to provide a large-capacity data exchange and processing capability.

Therefore, a data access and processing capability of the first network device in the distributed architecture is better than a data access and processing capability of the first network device in the centralized architecture. Optionally, the first network device 500A in another form may have only one card. In other words, there is no switching board, and functions of an interface board and a main control board are integrated into the card. In this case, a central processing unit on the interface board and a central processing unit on the main control board may be combined into one central processing unit on the card, to perform functions after the two central processing units are combined. A device in this form (for example, a network device such as a low-end switch or router) has a weaker data exchange and processing capability. A specific architecture that is to be used depends on a specific networking deployment scenario. This is not limited herein.

Figure 6B:
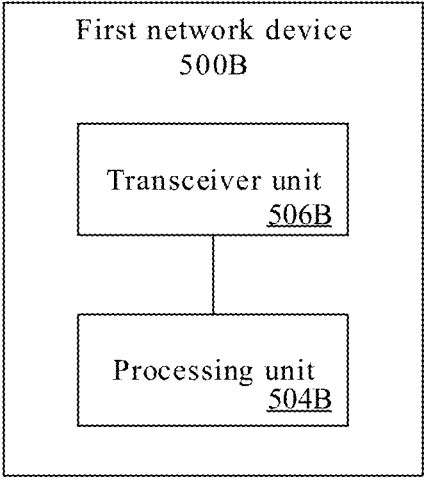
FIG. 6B is a schematic structural diagram of another first network device according to an embodiment of the present disclosure.

FIG. 6B is another possible schematic structural diagram of a first network device 500B to which the foregoing embodiment relates. The first network device 500B is applied to an SRv6 network. The first network device 500B includes a processing unit 504B and a transceiver unit 506B.

The transceiver unit 506B is configured to receive a first notification packet from a second network device, where the first notification packet includes a network slice identifier and indicates an association relationship between information of the network slice identifier and an IPv6 address prefix of the second network device, and the network slice identifier is used to identify one network slice.

The processing unit 504B is configured to generate a route forwarding entry for the IPv6 address prefix of the second network device based on an association relationship between the network slice identifier and the IPv6 address prefix of the second network device, and based on the IPv6 address prefix, the forwarding entry is generated in a route forwarding entry corresponding to the network slice.

The first network device 500B further includes a memory 508B, and the memory 508B is configured to store the route forwarding entry of the IPv6 address prefix of the second network device.

The processing unit 504B is further configured to obtain the network slice identifier and an IPv6 address prefix of the first network device 500B and generate a second notification packet.

The transceiver unit 506B is further configured to send the second notification packet to the second network device, where the second notification packet includes the network slice identifier and indicates an association relationship between the information of the network slice identifier and the IPv6 address prefix of the first network device.

It should be understood that the first network device 500B in this embodiment of the present disclosure may correspond to the first network device in the network slice generation method embodiment, modules in the first network device 500B and the foregoing other operations and/or functions are separately used to implement the steps and methods implemented by the first network device in the embodiments corresponding to FIG. 1 to FIG. 5. For brevity, details are not described herein again.

Figure 6C:
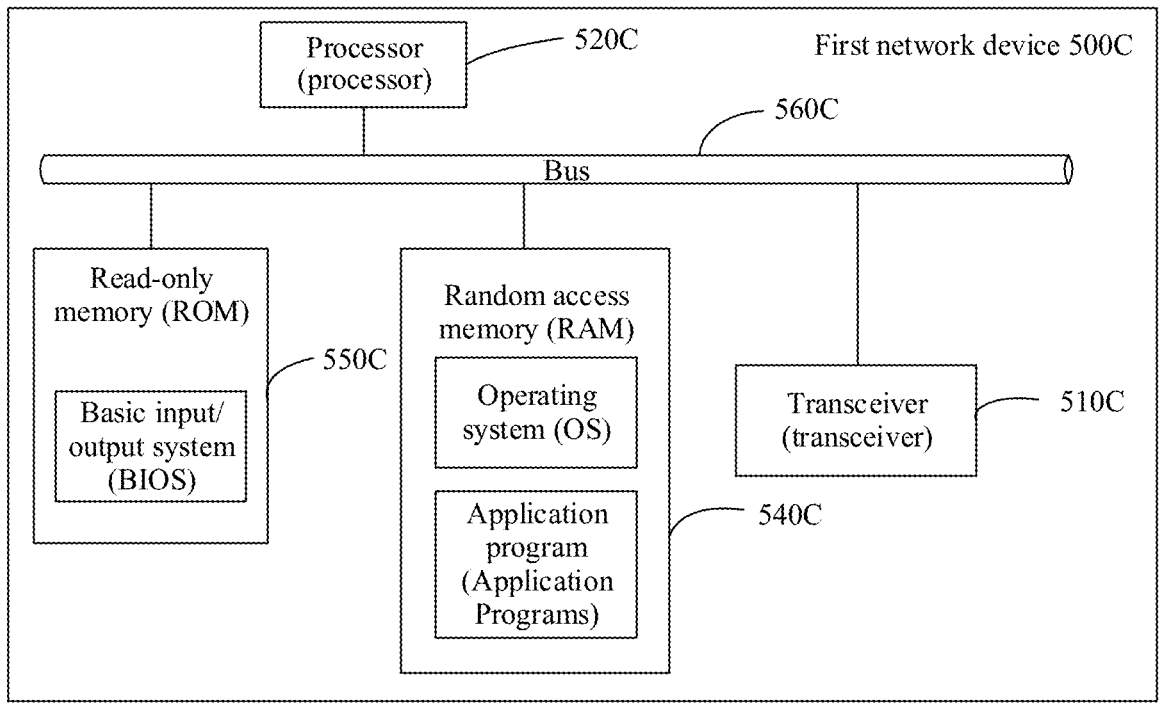
FIG. 6C is a schematic structural diagram of still another first network device according to an embodiment of the present disclosure.

FIG. 6C is a possible schematic structural diagram of a first network device 500C to which the foregoing embodiment relates. The first network device 500C is applied to an SRv6 network, and the first network device 500C includes a transceiver 510C, a processor 520C, a random access memory 540C, a read-only memory 550C, and a bus 560C. The processor 520C is separately coupled to the transceiver 510C, the random access memory 540C, and the read-only memory 550C by using the bus 560C. When the first network device 500C needs to run, the first network device 500C is started by using a basic input/output system built into the read-only memory 550C or a bootloader booting system in an embedded system, to boot the first network device 500C to enter a normal running state. After the first network device 500C enters the normal running state, an application program and an operating system run in the random access memory 540C, so that:

the transceiver 510C receives a first notification packet from a second network device, where the first notification packet includes a network slice identifier and indicates an association relationship between information of the network slice identifier and an IPv6 address prefix of the second network device, and the network slice identifier is used to identify one network slice, and the processor 520C generates a route forwarding entry for the IPv6 address prefix based on an association relationship between the network slice identifier and the IPv6 address prefix of the second network device. Based on the IPv6 address prefix, the forwarding entry is generated in a route forwarding entry corresponding to the network slice.

The random access memory 540C stores the route forwarding entry generated for the IPv6 address prefix.

The processor 520C further obtains the network slice identifier and an IPv6 address prefix of the first network device, and generates a second notification packet.

The transceiver 510C further sends the second notification packet to the second network device, where the second notification packet includes the network slice identifier and indicates an association relationship between the information of the network slice identifier and the IPv6 address prefix of the first network device.

The first network device 500C in this embodiment of the present disclosure may correspond to the first network device in the embodiments corresponding to FIG. 1 to FIG. 5, and the processor 520C, the transceiver 510C, and the like in the first network device 500C can implement functions of the first network device in the embodiments corresponding to FIG. 1 to FIG. 5 and/or steps and methods implemented by the first network device in the embodiments corresponding to FIG. 1 to FIG. 5. The processor 520C is configured to perform all operations of the processing unit 504B in the first network device in FIG. 6B, and the transceiver 510C is configured to perform all operations of the transceiver unit 506B in the first network device in FIG. 6B. For brevity, details are not described herein again.

It should be noted that in this embodiment, the first network device may alternatively be implemented based on a general physical server with reference to a network functions virtualization (NFV) technology, and the first network device is a virtual first network device (for example, a virtual host, a virtual router, or a virtual switch). The virtual first network device may be a virtual machine (VM) on which a program used for a network slice generation function is run, and the virtual machine is deployed on a hardware device (for example, a physical server). The virtual machine is a complete computer system simulated by software, having a complete hardware system function, and running in an isolated environment. After reading this application, with reference to the NFV technology, a person skilled in the art may virtualize on the general physical server a plurality of first network devices having the foregoing functions. Details are not described herein.

Figure 7A:
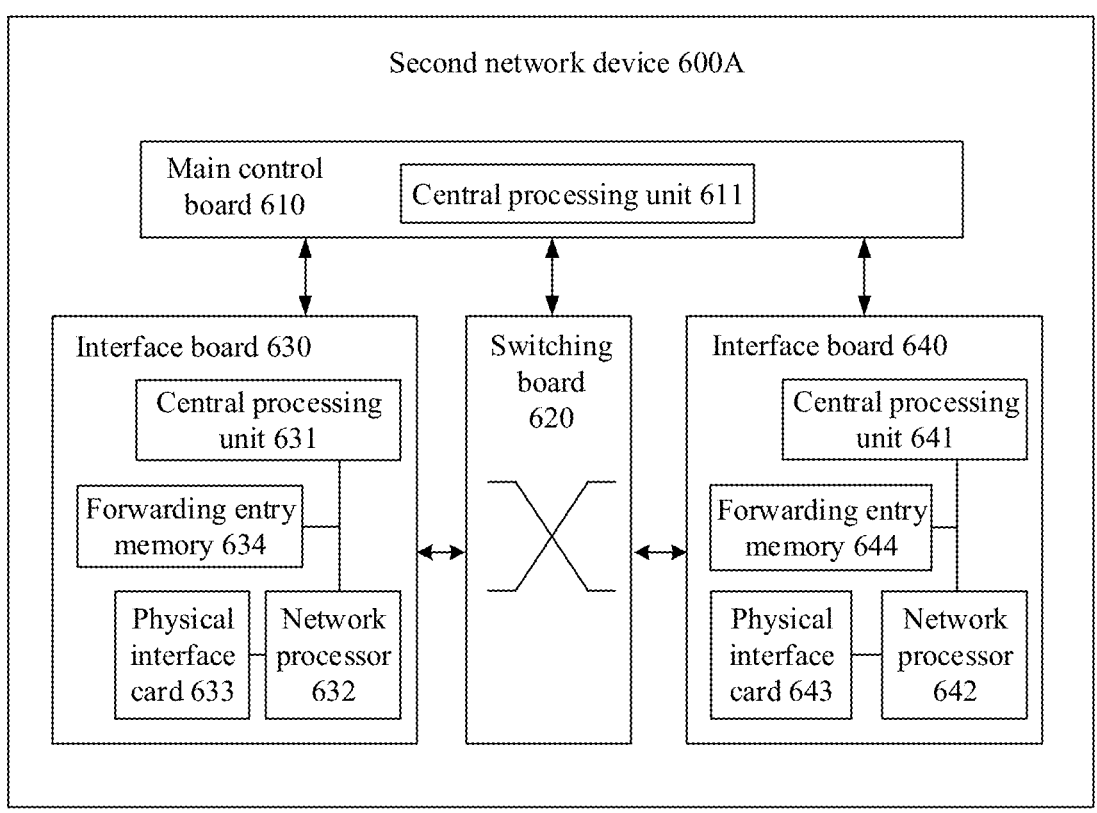
FIG. 7A is a schematic structural diagram of a second network device according to an embodiment of the present disclosure.

FIG. 7A is a possible schematic structural diagram of a second network device 600A to which the foregoing embodiment relates. The second network device 600A is applied to an SRv6 network, and includes a main control board 610, an interface board 630, a switching board 620, and an interface board 640. The main control board 610 is configured to complete functions such as system manage- ment, device maintenance, and protocol processing. The switching board 620 is configured to exchange data between various interface boards (the interface board is also referred to as a line card or a service board). The interface boards 630 and 640 are configured to provide various service interfaces (for example, an Ethernet interface and a POS interface), and implement data packet forwarding. The main control board 610, the interface boards 630 and 640, and the switching board 620 are connected to a platform backboard by using a system bus for interworking. A central processing unit 631 on the interface board 630 is configured to control and manage the interface board and communicate with a central processing unit 611 on the main control board 610.

The central processing unit 611 on the main control board 610 is further configured to obtain a network slice identifier (the network slice identifier is used to identify one network slice) and an IPv6 address prefix of the second network device, generate a first notification packet, and deliver the first notification packet to a network processor 632 by using the central processing unit 631. The first notification packet includes the network slice identifier and indicates an asso- ciation relationship between information of the network slice identifier and the IPv6 address prefix of the second network device (which is consistent with related descrip- tions in FIG. 2, and details are not described herein again).

The network processor 632 sends, based on that a desti- nation address of the first notification packet is a broadcast address in the network slice (virtual network), the first notification packet to all physical interface cards that belong to the network slice. The network processor 632 sends the first notification packet to a physical interface card 633, and sends the first notification packet to a first network device by using the physical interface card 633.

For steps that the central processing unit 611 specifically performs to perform the function in Part 223 in FIG. 2, and steps that the physical interface card 633 and the network processor 632 specifically perform to implement the func- tion in Part 222 in FIG. 2, refer to the foregoing related descriptions. Details are not described herein again.

It should be understood that, in this embodiment of the present disclosure, an operation on the interface board 640 is consistent with an operation on the interface board 630. For brevity, details are not described again. It should be understood that the second network device 600A in this embodiment of the present disclosure may correspond to the second network device in the network slice method embodi- ment, modules in the second network device 600A and the foregoing other operations and/or functions are separately used to implement the steps and methods implemented by the second network device in the embodiments correspond- ing to FIG. 1 to FIG. 5. For brevity, details are not described herein again.

It should be noted that, there may be one or more main control boards, and when there are a plurality of main control boards, the main control boards may include an active main control board and a standby main control board. There may be one or more interface boards, and the second network device having a stronger data processing capability provides more interface boards. There may also be one or more physical interface cards on the interface board. There may be no switching board, or one or more switching boards. When there are a plurality of switching boards, load sharing and redundancy backup may be implemented together. In a centralized forwarding architecture, the second network device may need no switching board, and the interface board provides a function of processing service data of an entire system. In a distributed forwarding archi- tecture, the second network device may have at least one switching board, and exchange data between a plurality of interface boards by using the switching board, to provide a large-capacity data exchange and processing capability. Therefore, a data access and processing capability of the second network device in the distributed architecture is better than a data access and processing capability of the second network device in the centralized architecture. Optionally, the second network device 600A in another form may have only one card. In other words, there is no switching board, and functions of an interface board and a main control board are integrated into the card. In this case, a central processing unit on the interface board and a central processing unit on the main control board may be combined into one central processing unit on the card, to perform functions after the two central processing units are com- bined. A device in this form (for example, a network device such as a low-end switch or router) has a weaker data exchange and processing capability. A specific architecture that is to be used depends on a specific networking deploy- ment scenario. This is not limited herein.

Figure 7B:
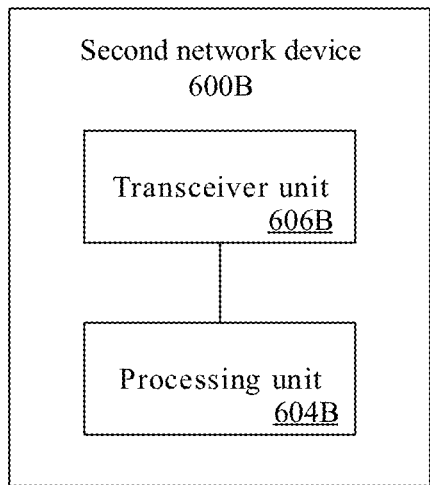
FIG. 7B is a schematic structural diagram of another second network device according to an embodiment of the present disclosure.

FIG. 7B is another possible schematic structural diagram of a second network device 600B to which the foregoing embodiment relates. The second network device 600B is applied to an SRv6 network. The second network device 600B includes a processing unit 604B and a transceiver unit 606B.

The processing unit 604B is configured to obtain a network slice identifier and an IPv6 address prefix of the second network device, and generate a first notification packet.

The transceiver unit 606B is configured to send the first notification packet to the first network device, where the first notification packet includes the network slice identifier and indicates an association relationship between information of the network slice identifier and the IPv6 address prefix of the second network device, and the network slice identifier is used to identify one network slice.

The transceiver unit 606B is further configured to receive a second notification packet from the first network device, where the second notification packet includes the network slice identifier and indicates an association relationship between the information of the network slice identifier and an IPv6 address prefix of the first network device.

The processing unit 604B is further configured to generate a route forwarding entry for the IPv6 address prefix of the first network device in the network slice based on an association relationship between the network slice identifier and the IPv6 address prefix of the first network device.

The second network device 600B further includes a memory 608B, and the memory 608B is configured to store the route forwarding entry of the IPv6 address prefix of the first network device.

It should be understood that the second network device 600B in this embodiment of the present disclosure may correspond to the second network device in the network slice generation method embodiment, modules in the second network device 600B and the foregoing other operations and/or functions are separately used to implement the steps and methods implemented by the second network device in the embodiments corresponding to FIG. 1 to FIG. 5. For brevity, details are not described herein again.

Figure 7C:
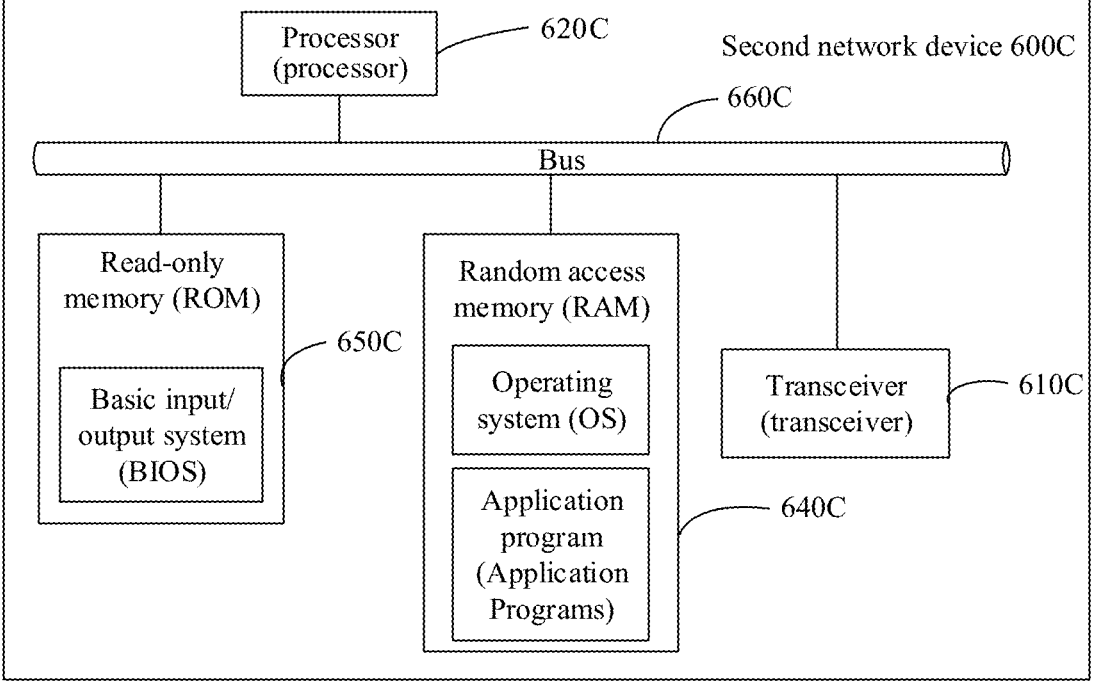
FIG. 7C is a schematic structural diagram of still another second network device according to an embodiment of the present disclosure.

FIG. 7C is a possible schematic structural diagram of a second network device 600C to which the foregoing embodiment relates. The second network device 600C is applied to an SRv6 network, and the second network device 600C includes a transceiver 610C, a processor 620C, a random access memory 640C, a read-only memory 650C, and a bus 660C. The processor 620C is separately coupled to the transceiver 610C, the random access memory 640C, and the read-only memory 650C by using the bus 660C. When the second network device 600C needs to run, the second network device 600C is started by using a basic input/output system built into the read-only memory 650C or a bootloader booting system in an embedded system, to boot the second network device 600C to enter a normal running state. After the second network device 600C enters the normal running state, an application program and an operating system run in the random access memory 640C, so that:

the processor 620C obtains a network slice identifier and an IPv6 address prefix of the second network device, and generates a first notification packet; and the transceiver 610C sends the first notification packet to the first network device, where the first notification packet includes the network slice identifier and indicates an association relationship between information of the network slice identifier and the IPv6 address prefix of the second network device, and the network slice identifier is used to identify one network slice.

The transceiver 610C further receives a second notification packet from the first network device, where the second notification packet includes the network slice identifier and indicates an association relationship between the information of the network slice identifier and an IPv6 address prefix of the first network device.

The processor 620C further generates a route forwarding entry for the IPv6 address prefix of the first network device in the network slice based on an association relationship between the network slice identifier and the IPv6 address prefix of the first network device.

The random access memory 640C stores the route forwarding entry of the IPv6 address prefix of the first network device.

The second network device 600C in this embodiment of the present disclosure may correspond to the second network device in the embodiments corresponding to FIG. 1 to FIG. 5, and the processor 620C, the transceiver 610C, and the like in the second network device 600C can implement functions of the second network device in the embodiments corresponding to FIG. 1 to FIG. 5 and/or steps and methods implemented by the second network device in the embodiments corresponding to FIG. 1 to FIG. 5. The processor 620C is configured to perform all operations of the processing unit 604B in the second network device in FIG. 7B, and the transceiver 610C is configured to perform all operations of the transceiver unit 606B in the second network device in FIG. 7B. For brevity, details are not described herein again.

It should be noted that in this embodiment, the second network device may alternatively be implemented based on a general physical server with reference to a network functions virtualization (NFV) technology, and the second network device is a virtual second network device (for example, a virtual host, a virtual router, or a virtual switch). The virtual second network device may be a virtual machine (VM) on which a program used for a notification packet sending function is run, and the virtual machine is deployed on a hardware device (for example, a physical server). The virtual machine is a complete computer system simulated by software, having a complete hardware system function, and running in an isolated environment. After reading this application, with reference to the NFV technology, a person skilled in the art may virtualize on the general physical server a plurality of second network devices having the foregoing functions. Details are not described herein.

Figure 8:
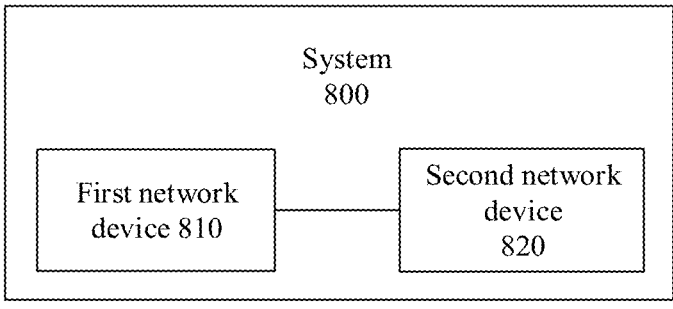
FIG. 8 is a schematic structural diagram of a system according to an embodiment of the present disclosure.

FIG. 8 is a schematic diagram of a route generation system 800 according to an embodiment of the present disclosure. As shown in FIG. 8, the system 800 includes a first network device 810 and a second network device 820. The first network device 810 is any first network device described in FIG. 6A, FIG. 6B, and FIG. 6C, or a virtual first network device, and the second network device 820 is any second network device described in FIG. 7A, FIG. 7B, and FIG. 7C or a virtual second network device. For a detailed description about each device in the system, refer to related chapters in FIG. 6A to FIG. 6C, FIG. 7A to FIG. 7C, and the like. Details are not described herein again.

It should be understood that a person skilled in the art can obtain, on a basis of reading this application, combinations of optional features, steps, or methods described in embodiments in this application without creative efforts, and all of the combinations belong to embodiments disclosed in this application. For simple description or writing, different combinations are not described.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the unit is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The storage medium includes various media that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A route generation method by a first network device in an Internet protocol version 6 (IPv6)-based segment routing over an IPv6 data plane (SRv6) network, wherein the method comprises:

receiving a first notification packet from a second network device, wherein the first notification packet includes slice information, and wherein the slice information corresponds to an algorithm, the first notification packet indicates an association relationship between the slice information and an IPV6 address prefix of the second network device, the first notification packet comprises a prefix field, the prefix field comprises the IPV6 address prefix of the second network device, the first notification packet further comprises a sub-type-length-value (sub-TLV) field, the prefix field is outside the sub-TLV field, the sub-TLV field includes an segment routing over an IPV6 data plane (SRv6) segment identifier (SID) field; and storing a forwarding entry according to the association relationship between the slice information and the IPV6 address prefix of the second network device.

2. The method according to claim 1, wherein the method further comprises:

obtaining the slice information and an IPV6 address prefix of the first network device, and generating a second notification packet; and sending the second notification packet to the second network device, wherein the second notification packet comprises the slice information, and the second notification packet indicates an association relationship between the slice information and the IPV6 address prefix of the first network device.

3. The method according to claim 1, wherein the first notification packet is an intermediate system to intermediate system (ISIS) protocol link state protocol data unit (LSPDU) message.

4. The method according to claim 3, wherein the LSPDU message comprises an IPv6 reachable type-length-value (TLV) field, the IPV6 reachable TLV field comprises the prefix field and the sub-TLV field, and the sub-TLV field is used to carry the slice information.

5. The method according to claim 1, wherein the slice information is determined according to an algorithm.

6. The method according to claim 1, wherein the slice information comprises a slice identifier.

7. The method according to claim 1, wherein the forwarding entry comprises at least one type of the following information: outbound interface information and next hop information.

8. The method according to claim 1, wherein the storing a forwarding entry according to the association relationship between the slice information and the IPV6 address prefix of the second network device comprises:

generating a forwarding entry for the IPV6 address prefix of the second network device according to the association relationship between the slice information and the IPV6 address prefix of the second network device.

9. The method according to claim 1, wherein each of a plurality of IPV6 address prefixes is associated with only one piece of slice information, the plurality of IPV6 address prefixes comprise the IPV6 address prefix of the second network device.

10. A notification packet sending method by a second network device in an Internet protocol version 6 (IPv6) based segment routing over an IPv6 data plane (SRv6) network, wherein the method comprises:

obtaining slice information and an IPV6 address prefix of the second network device, and generating a first notification packet; and sending the first notification packet to a first network device, wherein the first notification packet comprises the slice information, and wherein the slice information corresponds to an algorithm, the first notification packet indicates an association relationship between the slice information and the IPV6 address prefix of the second network device, the first notification packet is constructed to trigger the first network device to enable it to store a forwarding entry according to the association relationship between the slice information and the IPV6 address prefix of the second network device, the first notification packet comprises a prefix field, the prefix field comprises the IPV6 address prefix of the second network device, the first notification packet further comprises a sub-type-length-value (sub-TLV) field, the prefix field is outside the sub-TLV field, the sub-TLV field includes an segment routing over an IPV6 data plane (SRv6) segment identifier (SID) field.

11. The method according to claim 10, wherein the slice information is determined according to an algorithm.

12. The method according to claim 10, wherein the slice information comprises a slice identifier.

13. The method according to claim 10, wherein each of a plurality of IPv6 address prefixes is associated with only one piece of slice information, the plurality of IPv6 address prefixes comprise the IPV6 address prefix of the second network device.

14. A first network device, comprises:

a non-transitory memory storing instructions; and a processor coupled to the non-transitory memory; wherein the instructions, when executed by the processor, cause the first network device to:

receive a first notification packet from a second network device, wherein the first notification packet comprises slice information, and wherein the slice information corresponds to an algorithm, the first notification packet indicates an association relationship between the slice information and an Internet protocol version 6 (IPv6) address prefix of the second network device, the first notification packet comprises a prefix field, the prefix field comprises the IPV6 address prefix of the second network device, the first notification packet further comprises a sub-type-length-value (sub-TLV) field, the prefix field is outside the sub-TLV field, the sub-TLV field includes an segment routing over an IPV6 data plane (SRv6) segment identifier (SID) field; and storing a forwarding entry according to the association relationship between the slice information and the IPV6 address prefix of the second network device.

15. The first network device according to claim 14, wherein the instructions, when executed by the processor, further cause the first network device to:

obtain the slice information and an IPV6 address prefix of the first network device, and generate a second notification packet; and send the second notification packet to the second network device, wherein the second notification packet comprises the slice information, and the second notification packet indicates an association relationship between the slice information and the IPV6 address prefix of the first network device.

16. The first network device according to claim 14, wherein the first notification packet is an intermediate system to intermediate system (ISIS) protocol link state protocol data unit (LSPDU) message.

17. The first network device according to claim 16, wherein the LSPDU message comprises an IPV6 reachable type-length-value (TLV) field, the IPv6 reachable TLV field comprises the prefix field and the sub-TLV field, and the sub-TLV field is used to carry the slice information.

18. The first network device according to claim 14, wherein the slice information is determined according to an algorithm.

19. The first network device according to claim 14, wherein the slice information comprises a slice identifier.

20. The first network device according to claim 14, wherein the forwarding entry comprises at least one type of the following information: outbound interface information and next hop information.

21. The first network device according to claim 14, wherein the processor is further configured to:

generate a forwarding entry for the IPV6 address prefix of the second network device according to the association relationship between the slice information and the IPV6 address prefix of the second network device.

22. The first network device according to claim 14, wherein each of a plurality of IPV6 address prefixes is associated with only one piece of slice information, the plurality of IPV6 address prefixes comprise the IPV6 address prefix of the second network device.

23. A second network device, comprises:

a non-transitory memory storing instructions; and a processor coupled to the non-transitory memory; wherein the instructions, when executed by the processor, cause the second network device to:

obtain slice information and an IPV6 address prefix of the second network device, and generate a first notification packet; and send the first notification packet to a first network device, wherein the first notification packet comprises the slice information, and wherein the slice information corresponds to an algorithm, the first notification packet indicates an association relationship between the slice information and the IPV6 address prefix of the second network device, the first notification packet is constructed to trigger the first network device to enable it to store a forwarding entry according to the association relationship between the slice information and the IPV6 address prefix of the second network device, the first notification packet comprises a prefix field, the prefix field comprises the IPV6 address prefix of the second network device, the first notification packet further comprises a sub-type-length-value (sub-TLV) field, the prefix field is outside the sub-TLV field, the sub-TLV field includes an segment routing over an IPV6 data plane (SRv6) segment identifier (SID) field.

24. The second network device according to claim 23, wherein the slice information is determined according to an algorithm.

25. The second network device according to claim 23, wherein the slice information comprises a slice identifier.

26. The second network device according to claim 23, wherein each of a plurality of IPV6 address prefixes is associated with only one piece of slice information, the plurality of IPV6 address prefixes comprise the IPV6 address prefix of the second network device.

27. A network slice generation system, wherein the system comprises a first network device and a second network device;

wherein the first network device configured to execute first code to:

receive a first notification packet from the second network device, wherein the first notification packet comprises slice information, and wherein the slice information corresponds to an algorithm, the first notification packet indicates an association relationship between the slice information and an Internet protocol version 6 (IPv6) address prefix of the second network device, the first notification packet comprises a prefix field, the prefix field comprises the IPV6 address prefix of the second network device, the first notification packet further comprises a sub-type-length-value (sub-TLV) field, the prefix field is outside the sub-TLV field, the sub-TLV field includes an segment routing over an IPV6 data plane (SRv6) segment identifier (SID) field; and store a forwarding entry according to the association relationship between the slice information and the IPV6 address prefix of the second network device;

wherein the second network device configured to execute second code to:

obtain the slice information and the IPV6 address prefix of the second network device, and generate the first notification packet; and send the first notification packet to the first network device.

28. The network slice generation system according to claim 27, wherein each of a plurality of IPV6 address prefixes is associated with only one piece of slice information, the plurality of IPV6 address prefixes comprise the IPv6 address prefix of the second network device.

\* \* \* \* \*